No. 619,324. Patented Feb. 14, 1899.
R. MACRAE.
BATTERY SWITCH.
(Application filed Aug. 18, 1897. Renewed July 25, 1898.)
(No Model.)
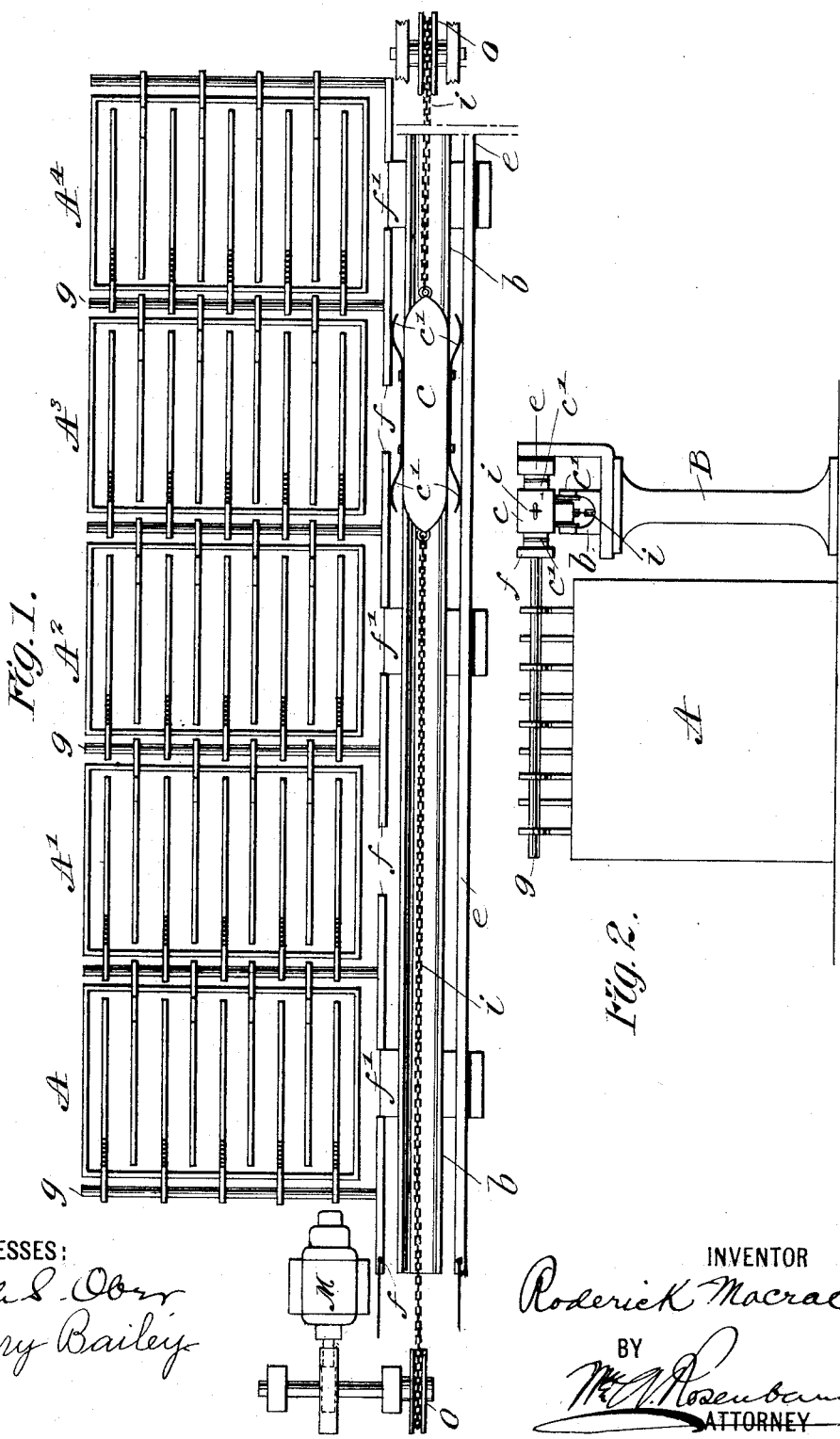
WITNESSES:
INVENTOR
Roderick Macrae
BY
ATTORNEY

UNITED STATES PATENT OFFICE.

RODERICK MACRAE, OF JERSEY CITY, NEW JERSEY.

BATTERY-SWITCH.

SPECIFICATION forming part of Letters Patent No. 619,324, dated February 14, 1899.

Application filed August 18, 1897. Renewed July 25, 1898. Serial No. 686,842. (No model.)

*To all whom it may concern:*

Be it known that I, RODERICK MACRAE, a subject of the Queen of Great Britain, residing at Jersey City, in the county of Hudson and State of New Jersey, have invented certain new and useful Improvements in Battery-Switches, of which the following is a full, clear, and exact description.

This invention relates to controlling-switches for electric batteries, particularly secondary batteries, the primary object being to dispose of the switch in such a manner that the great amount of copper heretofore used to connect the parts of the switch with the cells of battery is not required.

In making large installations of storage batteries it has been customary to place the battery in a cellar or other remote place and locate the controlling-switch for cutting in and out the cells of battery at or near the location where the current is used. The switch, which usually consists of a series of contacts corresponding with the cells of battery and a moving element for changing the circuits, has been connected with the cells by heavy copper wires, the cost of which is great. Furthermore, the many joints necessitated by the use of these connecting-wires, both at the battery and at the switch, give rise to serious losses in current and add resistance to the circuits. In accordance with my invention I place the switch immediately adjoining the cells of battery which it controls, locating it above, below, or at the side of the line of cells and utilizing extensions of the bus-bars between the cells as the contacts of the switch. The switch is coextensive with the row of cells which it controls and is operated by an electric motor, which moves a traveling circuit-changer over the line of contacts in the manner hereinafter described.

In the accompanying drawings, Figure 1 is a plan of a series or row of battery-cells and my controlling-switch arranged alongside thereof. Fig. 2 is an end view of the same.

Referring to the drawings by letter, A A' A², &c., represent a row of battery-cells. Only five cells are shown in the drawings; but it will be understood that in practice a much larger number will be used more advantageously with this arrangement. They are, however, preferably arranged in a straight line. Alongside the row of cells, preferably on a separate structure B, is constructed a track $b$ for a traveling contact device or car $c$, which is provided with wheels $c'$ for running upon the track. Along one side of the track there is suitably supported and insulated a continuous contact-strip $e$, and immediately opposite it are arranged a series of contact-strips $f$. The series $f$ corresponds with the series of battery-cells, there being one contact $f$ for each cell, and this contact is preferably made integral with the bus-bar $g$, to which the positive and negative plates of adjacent cells are connected, as shown; but it may be brazed or securely fastened in any manner to the bus-bar. They, however, are arranged to stand parallel at a uniform distance from the continuous strip $e$, and they are all of equal length and with equal spaces $f'$ between them. The traveling contact device $c$ is provided with brushes $c'$ or other suitable current-takers electrically connected together to bear upon the strip $e$ and the line of strips $f$. The opposite ends of the traveling car are connected with an endless chain or cord $i$, which passes over pulleys $o$ at each end of the line of cells, one of said wheels being mounted upon a shaft which is geared to the shaft of an electric motor M. The slack chain runs in the groove between the rails of the track. The consumption-circuit has its terminals connected, respectively, with the strip $e$ and the end strip $f$, as shown. As the car $c$ moves along it cuts in or out the cells according to its direction of movement, as will be understood. The motor will be controlled from a distance, it being caused to start, stop, and reverse by the usual mechanism for this purpose. The space and location occupied by the switch are nearly always available, and the cells or the plates in them, together with the bus-bars, may be bodily removed and replaced without making any connections or disconnections of wires at the switch, it being necessary only to see to it that the contact $f$ when replaced is properly adjusted with respect to the other parts of the switch.

Having thus described my invention, I claim—

1. The combination of a row of battery-cells, a track arranged alongside or adjacent thereto of substantially the same length as the row of cells, a traveling contact device moving on said track, a series of contacts insulated from each other corresponding to the series of cells and respectively connected with the latter, each contact and its corresponding insulating-space equaling in length the distance between the centers of the cells opposite which they are placed, and means for moving the traveling contact device along the track, substantially as described.

2. The combination of a row of battery-cells, a track extending parallel thereto and coextensive therewith, a traveling contact device moving on said track, a continuous contact-strip with which the contact device makes connection, a series of contact-strips corresponding to and connected with the cells, with which the traveling contact device also makes connection, an endless chain connected with the opposite end of said traveling contact device and means for moving said chain to cause the traveling contact device to move along the track, substantially as described.

In testimony whereof I subscribe my signature in presence of two witnesses.

RODERICK MACRAE.

Witnesses:
 FRANK S. OBER,
 HARRY BAILEY.